(12) United States Patent
Kwon

(10) Patent No.: US 12,260,860 B2
(45) Date of Patent: Mar. 25, 2025

(54) ELECTRONIC DEVICE AND CONTROL METHOD THEREFOR

(71) Applicant: SAMSUNG ELECTRONICS CO., LTD., Suwon-si (KR)

(72) Inventor: Jaesung Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 17/864,577

(22) Filed: Jul. 14, 2022

(65) Prior Publication Data

US 2022/0375473 A1 Nov. 24, 2022

Related U.S. Application Data

(63) Continuation of application No. 16/652,583, filed as application No. PCT/KR2018/014509 on Nov. 23, 2018, now Pat. No. 11,455,990.

(30) Foreign Application Priority Data

Nov. 24, 2017 (KR) .......................... 10-2017-0158057

(51) Int. Cl.
*G10L 15/22* (2006.01)
*G06F 3/0481* (2022.01)
(Continued)

(52) U.S. Cl.
CPC ............ *G10L 15/22* (2013.01); *G06F 3/0481* (2013.01); *G06F 3/167* (2013.01); *G10L 15/26* (2013.01);
(Continued)

(58) Field of Classification Search
CPC .... G10L 15/22; G10L 15/26; G10L 2015/223
See application file for complete search history.

(56) References Cited

U.S. PATENT DOCUMENTS 9,558,740 B1 1/2017 Mairesse et al.
9,589,561 B2 3/2017 Choi et al.
(Continued)

FOREIGN PATENT DOCUMENTS

EP 3226239 10/2017
JP 2007-226388 9/2007
(Continued)

OTHER PUBLICATIONS

International search report mailed Mar. 12, 2019, in corresponding International Patent Application No. PCT/KR2018/014509.
(Continued)

*Primary Examiner* — Ibrahim Siddo
(74) *Attorney, Agent, or Firm* — STAAS & HALSEY LLP

(57) ABSTRACT

An electronic device is disclosed. The electronic device comprises: a voice input unit; a storage unit for storing a first text according to a first transcript format and at least one second text obtained by transcribing the first text in a second transcript format; and a processor for, when a voice text converted from a user voice input through the voice input unit corresponds to a preset instruction, executing a function according to the preset instruction. The processor executes a function according to a preset instruction when the preset instruction includes a first text and a voice text is a text in which the first text of the preset instruction has been transcribed into a second text of a second transcript format.

20 Claims, 10 Drawing Sheets

(51) Int. Cl.
  *G06F 3/16* (2006.01)
  *G10L 15/26* (2006.01)
  *G10L 17/12* (2013.01)
  *H04R 1/08* (2006.01)

(52) U.S. Cl.
  CPC ........ *G10L 17/12* (2013.01); *G10L 2015/223* (2013.01); *H04R 1/08* (2013.01)

(56) References Cited

U.S. PATENT DOCUMENTS

| | | |
|---|---|---|
| 9,711,149 B2 | 7/2017 | Han et al. |
| 9,934,781 B2 | 4/2018 | Subhojit et al. |
| 10,134,387 B2 | 11/2018 | Bouk et al. |
| 10,134,390 B2 | 11/2018 | Shin |
| 10,586,536 B2 | 3/2020 | Jeong |
| 10,679,619 B2 | 6/2020 | Subhojit et al. |
| 11,114,099 B2 | 9/2021 | Subhojit et al. |
| 2005/0102141 A1 | 5/2005 | Chikuri |
| 2008/0167872 A1 | 7/2008 | Okimoto et al. |
| 2010/0003006 A1 | 1/2010 | Tokunaka |
| 2013/0250347 A1 | 9/2013 | Kono |
| 2014/0180688 A1 | 6/2014 | Kwon et al. |
| 2014/0330561 A1 | 11/2014 | Cho et al. |
| 2015/0073801 A1 | 3/2015 | Shin et al. |
| 2015/0189362 A1* | 7/2015 | Lee ................ H04N 21/42203 725/38 |
| 2015/0379993 A1 | 12/2015 | Subhojit et al. |
| 2016/0063995 A1 | 3/2016 | Choi et al. |
| 2016/0248899 A1* | 8/2016 | Lee ................ H04M 1/724 |
| 2016/0358603 A1 | 12/2016 | Azam et al. |
| 2017/0256260 A1 | 9/2017 | Jeong |
| 2018/0069815 A1 | 3/2018 | Fontana et al. |
| 2018/0190289 A1 | 7/2018 | Subhojit et al. |
| 2020/0302929 A1 | 9/2020 | Subhojit et al. |
| 2021/0407508 A1 | 12/2021 | Subhojit et al. |

FOREIGN PATENT DOCUMENTS

| | | |
|---|---|---|
| JP | 2009-163643 | 7/2009 |
| JP | 2009-258293 | 11/2009 |
| KR | 10-1301148 | 9/2013 |
| KR | 10-2014-0080089 | 6/2014 |
| KR | 10-2014-0131093 | 11/2014 |
| KR | 10-1474854 B1 | 12/2014 |
| KR | 10-2015-0089145 | 8/2015 |
| KR | 10-2016-0001965 | 1/2016 |
| KR | 10-2016-0025301 | 3/2016 |
| KR | 10-2016-0029450 | 3/2016 |
| KR | 10-2016-0056734 | 5/2016 |
| KR | 10-2017-0035529 | 3/2017 |

OTHER PUBLICATIONS

Written Opinion of the International Searching Authority mailed Mar. 12, 2019, in corresponding International Patent Application No. PCT/KR2018/014509.
U.S. Office Action dated Dec. 10, 2021 from copending U.S. Appl. No. 16/652,583.
U.S. Notice of Allowance dated Apr. 15, 2022 from copending U.S. Appl. No. 16/652,583.
Korean Office Action dated Mar. 22, 2022 from Korean Application No. 10-2017-0158057.
U.S. Appl. No. 16/652,583, filed Mar. 31, 2020, Jaesung Kwon, Samsung Electronics Co., Ltd.
Office Action dated Oct. 30, 2023, issued in Vietnam Patent Application No. 1-2020-03263.
Office Action dated Nov. 27, 2023, issued in Korean Patent Application No. 10-2022-0130043.
Korean Notice of Allowance dated Jul. 14, 2022 Korean Patent Application No. 10-2017-0158057 (5 pages; 1 page English translation).
Korean Office Action dated May 23, 2023 for Korean Patent Application No. 10-2022-0130043.
Notice of Submission of Opinions issued by the Korean Patent Office on Dec. 12, 2024 for Korean Patent Application No. 10-2024-0103397.

* cited by examiner (a)

(b)

(c)

| FIRST TEXT | SECOND TEXT |
|---|---|
| Smart | 스마트... |
| TV | 티비,티뷔,텔레비... |
| 4 | 포,사,넷... |
| + | plus,플러스... |
| Samsung | 삼성... |
| Mission | 미션... |
| Impossible | 임파서플,임파시블... |
| ⋮ | ⋮ |

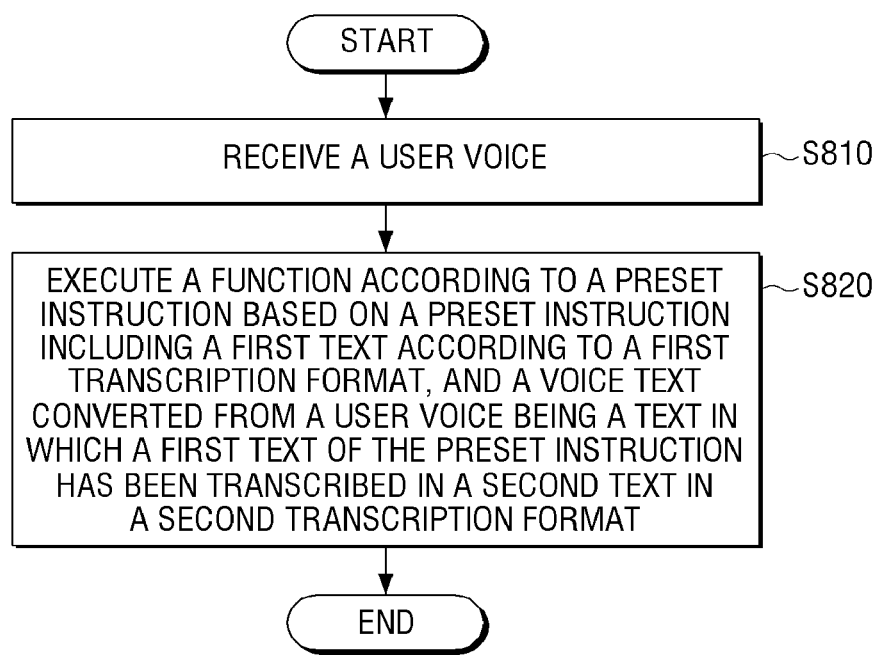

US 12,260,860 B2

ELECTRONIC DEVICE AND CONTROL METHOD THEREFOR

CROSS-REFERENCE TO RELATED APPLICATIONS

This application is a continuation application of U.S. application Ser. No. 16/652,583 filed on Mar. 31, 2020, which is a U.S. National Stage Application which claims the benefit under 35 U.S.C. § 371 of International Patent Application No. PCT/KR2018/014509 filed on Nov. 23, 2018, which claims foreign priority benefit under 35 U.S.C. § 119 of Korean Patent Application No. 10-2017-0158057 filed on Nov. 24, 2017 in the Korean Intellectual Property Office, the contents of each of which are incorporated herein by reference.

TECHNICAL FIELD

This disclosure relates to an electronic device and a control method therefor. More particularly, the disclosure relates to an electronic device that may be controlled by voice recognition and a control method therefor.

BACKGROUND ART

With the technology development, as voice recognition of a user is enabled in a display device such as a smart phone and a smart television (TV), a user may control an operation of a display device or receive various content services through an uttered voice without an additional operation.

It is common for a cloud-based voice recognition service to determine execution of a function operation based on a voice recognition result in a natural language understanding (NLU) module. When a user inputs a voice instruction to the electronic device, the voice recognition server receives the voice instruction from the electronic device and performs voice recognition. The voice recognition server transmits a voice recognition result to the NLU module (and may additionally transmit a voice recognition result to the electronic device to quickly execute a pre-registered instruction in the electronic device), and the NLU module may analyze the voice recognition result to derive a proper function execution method, and transmit the result to the electronic device.

However, if it is a situation where the NLU processing is difficult to be processed, or if shortening of a response time is required, the function may be performed only by the voice recognition result before the NLU processing. For example, a display device, such as a TV, compares a voice recognition result with a character of an instruction in order to execute an instruction based on a pre-registered instruction for a basic function ("volume-up", "channel-up"), and a voice touch (a technology for performing a function via a voice by registering a text of a selection item displayed on a display screen as an instruction), and performs a function of an instruction that perfectly matches.

However, in this related art, a perfectly matched instruction is found by comparing an instruction and a character of the voice recognition result, and if there is a mismatch in the instruction transcription or there are diverse representations of the instruction, character comparison may not be performed correctly and thus, there may be a concern for a user to have a negative feeling of the voice recognition function.

DISCLOSURE

Technical Problem

The disclosure provides an electronic device capable of processing a voice instruction according to various transcription methods and a control method therefor.

Technical Solution

An electronic device according to an embodiment includes a voice inputter, a storage configured to store a first text according to a first transcription format and at least one second text obtained by transcribing the first text in a second transcript format, and a processor configured to, based on a voice text converted from a user voice input through the voice inputter corresponding to a preset instruction, execute a function according to the preset instruction, and the processor is configured to execute a function according to the preset instruction, based on the preset instruction including the first text, and the voice text being a text in which the first text of the preset instruction has been transcribed into a second text in the second transcription format.

The voice text may be divided in a preset text unit, and the processor is configured to, based on at least one of a text unit of the voice text including the second text, identify a first text corresponding to each of the second text, from the storage, and execute a function corresponding to an instruction identified based on the identified first text and the second text.

The processor is configured to calculate a first similarity score of the preset instruction and the user voice based on a text unit of the voice text and whether any one of the identified first texts is included in the preset instruction, and based on the calculated first similarity score being greater than or equal to a preset threshold value, execute a function according to the preset instruction.

The preset instruction is divided in a preset text unit, and the processor is configured to, based on whether each of a text unit of the preset instruction being included in the text unit of the voice text and any one of the identified first text, further calculate a second similarity score of the preset instruction and the user voice, and based on each of the calculated first and second similarity scores being greater than or equal to a preset threshold value, execute a function according to the preset instruction.

The electronic device may further include a display, and the preset instruction may be displayed on a user interface (UI) provided through the display.

The processor is configured to control the display to display a screen on which a function according to the preset instruction is executed.

The electronic device further includes a communicator, and the processor is configured to control the communicator to transmit an image providing a screen on which the function according to the preset instruction is executed to a display device connected to the electronic device.

The voice inputter may include a microphone.

The processor is configured to control the communicator to transmit the user voice input through the voice inputter to an external device and receive, from the external device, a voice text converted from the user voice according to voice recognition.

The second text is a text that is transcribed differently from the first text according to at least one of a transcription format of a loanword, a transcription format of a number, and a transcription formation of a symbol.

A control method of an electronic device storing a first text according to a first transcription format and at least one second text obtained by transcribing the first text in a second transcription format includes receiving a user voice; and based on a voice text converted from the input user voice corresponding to a preset instruction, executing a function according to the preset instruction, and the executing may include executing a function according to the preset instruction, based on the preset instruction including the first text, and the voice text being a text in which the first text of the preset instruction has been transcribed into the second text in the second transcription format.

The voice text may be divided in a preset text unit, and the executing may include, based on at least one of a text unit of the voice text including the second text, identifying a first text corresponding to each of the second text, from the storage, and executing a function corresponding to an instruction identified based on the identified first text and the second text.

The executing may include calculating a first similarity score of the preset instruction and the user voice based on the text unit of the voice text and whether any of the identified first texts is included in the preset instruction; and based on the calculated first similarity score being greater than or equal to a preset threshold value, executing a function according to the preset instruction.

The preset instruction may be divided in a preset text unit, and the method may include, based on whether each of a text unit of the preset instruction being included in the text unit of the voice text and any one of the identified first text, calculating a second similarity score of the preset instruction and the user voice, and the executing may include, based on each of the calculated first and second similarity scores being greater than or equal to a preset threshold value, executing a function according to the preset instruction.

The method may further include displaying a user interface (UI) including the preset instruction and displaying a screen on which a function according to the pest instruction is executed.

The control method may further include transmitting an image providing a screen on which the function according to the preset instruction is executed to a display device connected to the electronic device.

The method may further include transmitting the user voice input through the voice inputter to an external device and receiving, from the external device, a voice text converted from the user voice according to voice recognition.

The preset text unit may include at least one of words, numbers, or symbols.

The receiving the user voice further include receiving the user voice from a remote control device for controlling the electronic device.

The second text may be a text that is transcribed differently from the first text according to at least one of a transcription format of a loanword, a transcription format of a number, and a transcription formation of a symbol.

Effect of Invention

According to various embodiments, even if there is a mismatch between a voice recognition result and an instruction transcription, a function of an instruction according to a user's intention may be executed, thus improving user's satisfaction and convenience.

DESCRIPTION OF DRAWINGS

FIG. 8 is a flowchart illustrating a method for controlling the electronic device according to an embodiment.

BEST MODE FOR CARRYING OUT THE INVENTION

Detailed Description of Embodiments

Figure 1A:
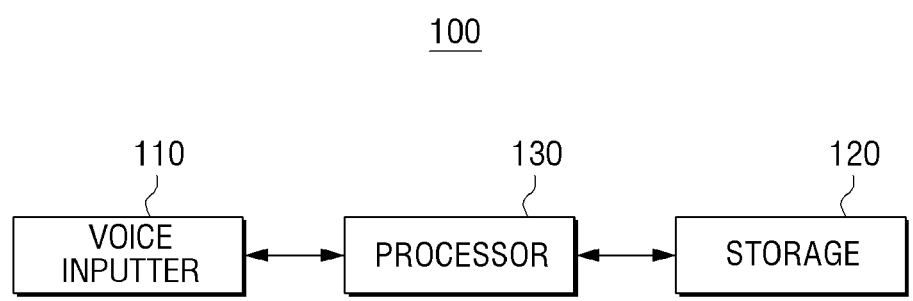
FIGS. 1A to 1C are block diagrams briefly illustrating a configuration of an electronic device according to various embodiments.

The disclosure will be described in greater detail below with reference to the accompanying drawings.

The terms used in the present disclosure and the claims are general terms identified in consideration of the functions of the various example embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

The same reference numbers or numerals set forth in each of the drawings attached hereto illustrate components or elements that perform substantially the same function. For convenience of description and understanding, the same reference numerals or symbols will be used in different embodiments. In other words, although all of the elements having the same reference numerals are shown in the plurality of drawings, a plurality of the drawings are not meant to imply a single embodiment.

In addition, in the present specification and the claims, the term "first", "second", etc., can be used to distinguish between elements. These ordinal numbers are used to distinguish the same or similar components from each other, and the meaning of the term should not be construed to limit the meaning of the term. In one example, the elements associated with such ordinal numbers should not be interpreted as limiting in order or order of use by that number. If desired, each of the ordinal numbers may be used interchangeably.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In an embodiment, when it is assumed that a portion is connected to another portion, it also includes a direct connection, as well as an indirect connection through another medium. In addition, meaning that a portion includes any element, it is to be understood that the meaning may further include other components rather than excluding other components unless specifically stated otherwise.

Hereinafter, the present invention will be described in detail with reference to the accompanying drawings.

Figure 1B:
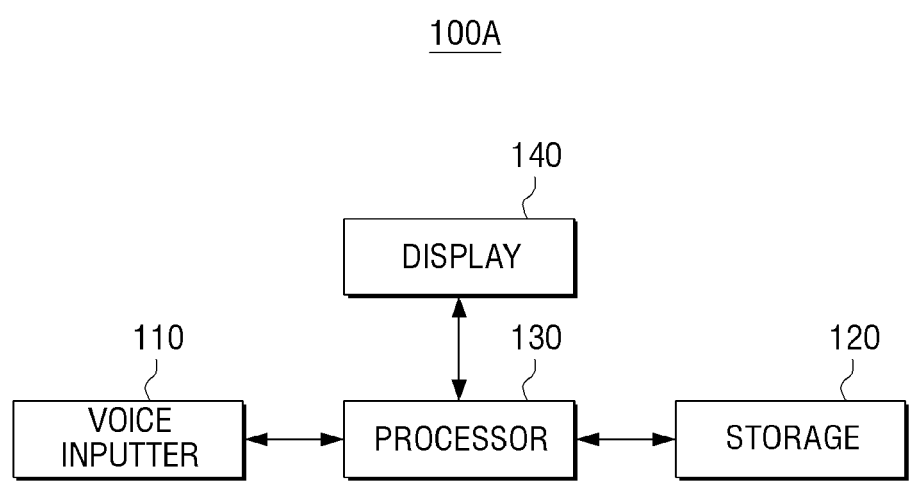
Figure 1C:
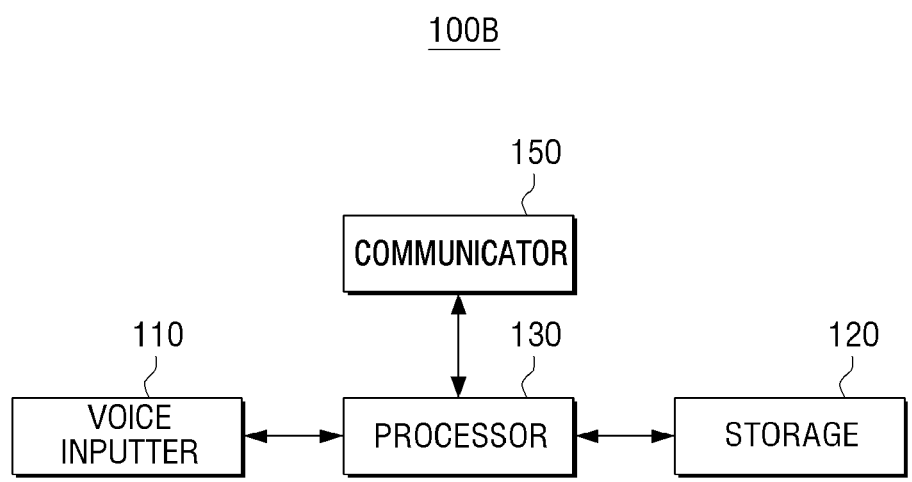

FIGS. 1A to 1C are block diagrams briefly illustrating a configuration of an electronic device according to various embodiments.

According to FIG. 1A, an electronic device 100 according to an embodiment essentially includes a voice inputter 110, a storage 120, and a processor 130.

Figure 2:
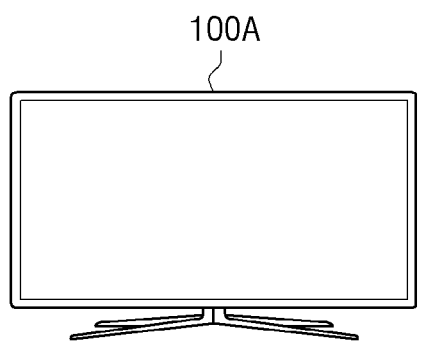
FIG. 2 is a diagram illustrating an implementation example of the electronic device according to an embodiment.
Figure 2:
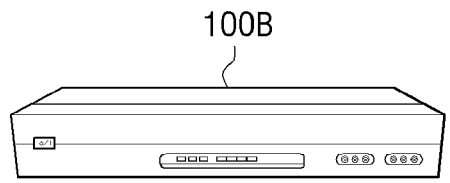
Figure 2:
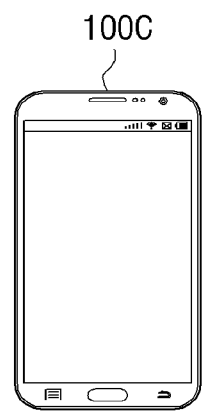

The electronic device 100 is a device for recognizing an uttered voice of a user and performing an operation intended by the user, and may be implemented with various electronic devices such as a smart television (TV) as shown in FIG. 2A, a set-top box as shown in FIG. 2B, a smartphone as shown in FIG. 2C, or the like. The electronic device 100 may be implemented with a variety of electronic devices such as tablet PCs, personal digital assistants (PDAs), notebook computers, or the like.

The voice inputter 110 of the electronic device 100 is configured to receive voice from a user. The voice inputter 110 includes a microphone and may collect voice corresponding to the voice uttered by the user. The microphone may receive a voice or sound from the outside and generate an electrical voice signal under the control of the processor 130.

The voice inputter 110 may receive a voice signal from a user by performing communication through a wired network or a wireless network. For example, if a remote controller 10 for controlling the electronic device 100 includes a microphone, the remote controller 10 may collect user voice and transmit the collected analog signal or a digital signal to the electronic device 100. When the received voice signal is an analog signal, the voice inputter 110 may convert the received voice signal into a digital signal.

The voice inputter 110 may receive a voice signal through an external microphone connected with the electronic device 100.

The storage 120 is configured to store various data related to execution of a function, voice recognition, content display, or the like, of the electronic device 100. The storage 120 stores a first text according to a first transcription format and at least one second text obtained by transcribing the first text in a second transcription format.

The first text may include at least one of a word, a number, a symbol, and a sentence. For example, the first text may include words such as "smart," "home," "mode," "setting," numbers such as "1," "3," "7," symbols such as "+," "*," "#," sentences such as "turn off TV," "turn on channel 10," or the like.

The second text refers to a text which is obtained by transcribing the first text in another transcription format. Specifically, the second text may be a text that is represented to be different from the first text according to at least one of a transcription format of a loanword, a transcription format of numbers, and a transcription formation of a symbol of the first text.

For example, when the first text is "smart," the second text may be "스마트" which is a Korean transcription of "smart." If the first text is "3," the second text may be words such as "삼," "셋," "three," and "쓰리", instead of the number 3. If the first text is "+," the second text may be "plus" or 플러스 or the like, in which "+" is transcribed in English or Korean.

The storage 120 may store one or a plurality of second texts, where the first text is transcribed in a second transcription format different from the first transcription format, based on the first text according to the first transcription format. Here, the first text may be pre-set and may be the word, number, or symbol specified by the user. The first text may be plural, and at least one second text matching the first text may be stored in the storage 120 in a list format, respectively. The matching list of the first text and at least one second text matching the first text will be described in more detail in FIG. 4.

The processor 130 is configured to control the overall operation of the electronic device 100. The processor 130 performs a function according to the preset instruction if the voice text, which has been converted from the user voice input through the voice inputter 110, corresponds to the preset instruction.

Here, the preset instruction may be, for example, "Smart TV home" to display a menu screen provided by the electronic device 100, a "movie mode setting" to display a screen capable of setting a watching mode of the movie content currently watched, or the like. This preset instruction may be stored in the storage 120 for voice recognition. At this time, the preset instruction may be stored in a text format, compared to the text in which the user voice is converted by voice recognition, and the function according to the instruction corresponding to the text converted from the user voice may be executed.

The preset instruction may be a text that refers to a particular content. For example, the preset instruction may include a movie title, such as "Mission Impossible 4." In a voice touch environment in which any one of various user interfaces (UIs) displayed on a display included in the electronic device 100 or an external display device connected to the electronic device 100 is selected by a user voice, the preset instruction may be a text included in each UI. The UI may include a menu for executing a specific function of the electronic device 100 with respect to the currently displayed screen or a menu for executing specific content, and the text corresponding to each UI may be a name of a specific function displayed in the menu or a title of a specific content.

The processor 130 executes the function according to the preset instruction when the voice text converted from the user voice corresponds to the preset instruction. For example, if the preset instruction corresponding to the voice text in which the user voice is converted is "Smart TV home," the processor 130 may perform a function of displaying a basic menu screen provided by the electronic device 100. If the preset instruction corresponding to the voice text in which the user voice is converted is "Mission Impossible 4", the processor 130 may perform the function of reproducing the contents corresponding to the "Mission Impossible 4."

If the preset instruction includes the first text and the voice text converted from the user voice is a text in which the first text of the preset instruction is transcribed as the second text in the second transcription format, the processor 130 may execute a function corresponding to the preset instruction.

For example, assuming that the preset instruction is "Smart TV home" and the voice text converted from the user voice is a " 스마트 티비 홈 ", the "smart", "TV" and "home" included in "Smart TV home", which is the preset instruction, correspond to the first text in which "'스마트'", "'디비'" and " 홈 " which are the second texts transcribed in the second transcription format are transcribed in the first transcription format, respectively.

If the condition is satisfied, the processor 130 may execute a function corresponding to "Smart TV home" which is the preset instruction, if the voice text converted from the user voice is a " 스마트 티비 홈 ," instead of "Smart TV home."

A specific embodiment in which the feature of the disclosure is specified will be described with reference to FIGS. 4 to 6.

An electronic device 100A according to an embodiment may be implemented as a display device including a display 140 as shown in FIG. 1B. The electronic device 100A includes the electronic device having a display panel, such as a TV, a smartphone, a notebook, a personal digital assistant (PDA), or the like.

The processor 130 may control the display 140 to display a user interface (UI) including the preset instruction. Then, if any one of the UIs displayed on the display 140 is selected by the user voice, the display 140 may be controlled to execute a function according to the preset instruction included in the selected UI, and to display a screen in which the corresponding function is executed.

As shown in FIG. 1C, an electronic device 100B according to another embodiment may be implemented as the electronic device including a communicator 150 connected to an external display device 200 through a wired or wireless network. That is, the electronic device 100B is connected to the display device 200 such as a set-top box, a digital versatile disc (DVD) player, a game machine, etc., and includes the electronic device for providing an image to a display device.

The processor 130 may control the communicator 150 to transmit an image providing a UI including a preset instruction to the display device 200 connected to the electronic device 100B. In addition, if any one of the UIs displayed on the display device is selected by the user voice, the processor 130 may control the communicator 150 to execute a function according to the preset instruction included in the selected UI, and transmit the image on which the corresponding function is executed to the display device 200 connected to the electronic device 100B.

Figure 3:
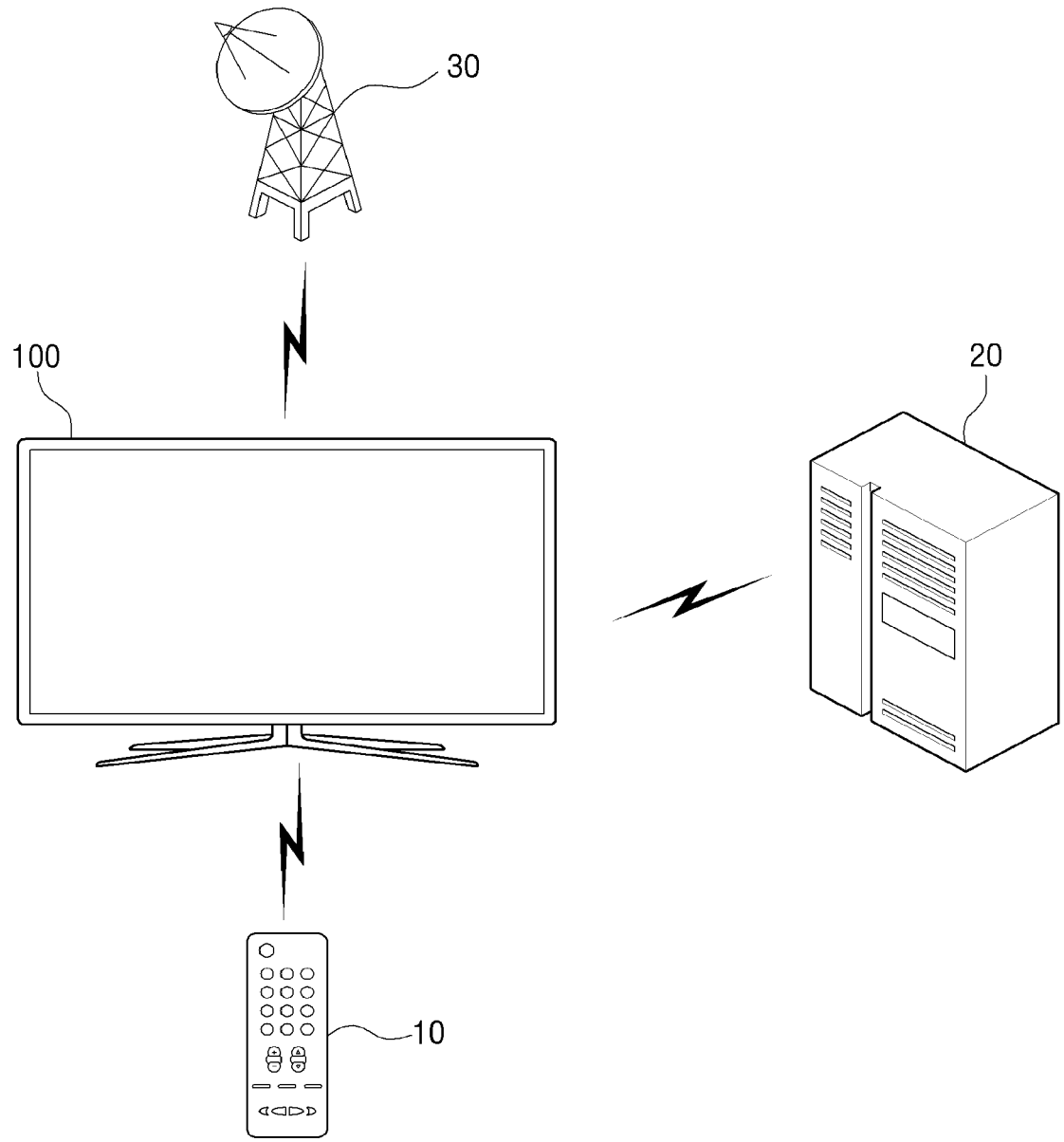
FIG. 3 is a diagram illustrating a voice recognition system according to an embodiment.

FIG. 3 is a diagram illustrating a voice recognition system according to an embodiment.

Hereinafter, in order to facilitate understanding, the electronic device 100 is limited to an embodiment in which the display device is implemented, and the electronic device 100 is described as a display device. However, it will be readily recognized from the various embodiments of the electronic device 100 described above that the electronic device 100 is not limited to a display device that includes a display.

The display device 100 includes the communicator 150, and the communicator 150 may include a first communicator 151 for communicating with an external first server 20 for performing voice recognition, and a second communicator 152 for communicating with an external second server 30 for providing broadcast content or content related information.

When the display device 100 is operating in a voice recognition mode, the uttered voice of the user may be input to the display device 100. At this time, the first user may perform utterance to cause the display device 100 to operate in a voice recognition mode. When the uttered voice of the user is input, the display device 100 may analyze the voice signal of the input voice signal to determine whether the voice signal is a trigger instruction for entering the voice recognition mode.

As a result of the determination, if the uttered voice is an instruction to operate in the voice recognition mode, the processor 120 may control the display device 100 to enter the voice recognition mode. As described above, when the additional uttered voice of the user is input while the display device 100 enters the voice recognition mode, the display device 100 may internally perform an operation to recognize the additionally uttered voice.

However, the display device 100 may not require a trigger instruction to enter the voice recognition mode, and may operate in a state that always senses the user voice or senses the user voice in a preset cycle, so that voice recognition may be performed without a trigger instruction.

The voice inputter 110 of the display device 100 may be implemented as a microphone to directly sense the user voice uttered from the user and may receive user voice from the remote controller 10 controlling the display device 100.

Specifically, the remote controller 10 is a device for controlling the operation of the display device 100 by communicating with the display device 100, and includes a remote controller, a keyboard, or the like. The user voice uttered from the user may be sensed via a microphone provided in the remote controller 10, and the display device 100 may receive user voice from the remote controller 10. For this purpose, the communicator 150 may further include a third communicator 153 for receiving user voice from the remote controller 10.

However, when the communication method performed by the display device 100 and the remote controller 10 is the same as the communication method performed by the display device 100 and the first server 20 or the second server 30, the third communicator 153 may be omitted. For example, when the display device 100 and the remote controller 10 perform communication using the Wi-Fi module, and the display device 100 and the first server 20 perform communication using the Wi-Fi module, the display device 100 may not separately include the third communicator 153 and communicate with the remote controller 10 through the Wi-Fi module included in the first communicator 151.

In addition, when the display device 100 and the remote controller 10 perform communication using a Wi-Fi module or the display device 100 performs communication with the first server 20 and the second server 20 using the Ethernet modem, the display device 100 may have to include a third communicator 153 including a Wi-Fi module or the Bluetooth module.

In addition, a user portable terminal, such as a smart phone, may serve as the remote controller 10 to control the operation of the display device 100. Recently, a remote control related application capable of controlling various external devices is installed in a smart phone, and a technique for controlling an external device by manipulating a UI provided on the application is generally used. For this purpose, the smart phone may include an infrared transmitting portion, and may transmit the control signal to the display device 100 through the infrared transmitting portion. Alternatively, the smart phone and the display device 100 may transmit and receive various control signals through Wi-Fi communication and Bluetooth communication.

According to various embodiments, the display device 100 may include a plurality of communication units according to each communication method so as to communicate with the remote controller 10 or a user portable terminal serving as the remote controller 10 in various methods.

Accordingly, an embodiment may be obvious that the user inputs a voice through a microphone included in the smart phone, and transmits the input voice to the display device 200 using communication such as Wi-Fi.

If the user voice is received through the voice inputter 110, the display device 100 may transmit the received user voice to the first server 20. The first server 20 may convert the received user voice into text and transmit the converted text (hereinafter, voice text) to the display device 100. That is, the first server 20 may be implemented as a speech-to-text (STT) server that analyzes the sound information to convert the voice signal into a text format. When the display device 100 receives the voice text from the first server 20, a keyword may be extracted from the received voice text and an instruction corresponding to the extracted keyword may be executed.

According to an embodiment, the display device 100 may store a voice recognition module and convert the voice signal into a text format. That is, the display device 100 may perform voice recognition based on an embedded method that recognizes by itself a user's uttered voice related to an instruction pre-registered in the storage 120.

If an instruction corresponding to the extracted keyword is a request for reproduction of a specific content or information related to a specific content, the display device 100 may transmit a signal according to the request to the second server 30. The second server 30 is a server for providing content-related information, and may search and provide information related to the specific content to the user. The display device 100 may receive and display content related information from the second server 30. For example, if the instruction is "Mission Impossible 4", the display device 100 may receive and display the movie information associated with "Mission Impossible 4" from the second server 30 or receive and reproduce the movie content corresponding to "Mission Impossible 4."

In the embodiment, although the first server 20 and the second server 30 are separate servers, the first server 20 and the second server 30 may be implemented as the same server. That is, the display device 100 may perform communication with an integrated server which analyzes sound information to convert a voice signal into a text format, and simultaneously performs a role of providing broadcast content or content related information. In this case, the first communicator 151 and the second communicator 152 may be integrated into one to perform communication with the integrated server.

Figure 4:
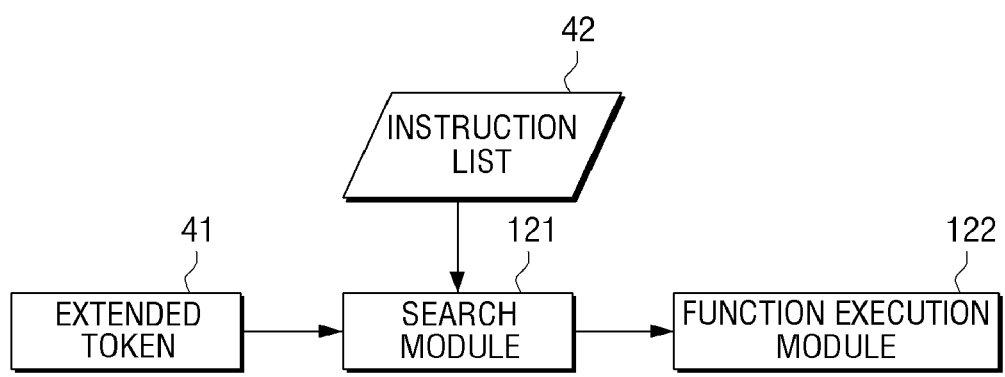
FIG. 4 is a block diagram illustrating a method for executing a function by an extended text according to an embodiment.

FIG. 4 is a block diagram illustrating a method for executing a function by an extended text according to an embodiment.

As illustrated in FIG. 4, the processor 130 of the display device 100 may search instructions corresponding to the user voice using a search module 121 and a function execution module 122 stored in the storage 120, and may execute the function according to the searched instructions.

First, the processor 130 extracts the first text stored in the storage 120 based on the voice text converted from the user voice. Specifically, when the second text is included in the voice text, the processor 130 may extract the first text matching the second text included in the voice text from the storage 120. The first text may include various text units, such as words, numbers, symbols, or the like.

Figure 5:
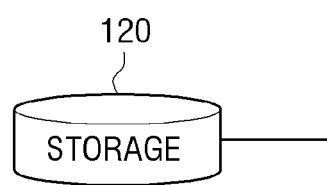
FIG. 5 is a diagram illustrating an extended word list according to an embodiment.

As illustrated in FIG. 5, the storage 120 of the display device 100 according to an embodiment may store the first text in accordance with a transcription format and at least one second text in which the corresponding text according to the first text is transcribed in another transcription format. The first text stored in the storage 120 is a preset text unit (hereinafter, referred to as a token) constituting the preset instruction, and the second text stored in the storage 120 may be a token for extending the transcription format of the first text. The storage 120 may store a text matching list in which the first text according to one transcription format and the second text which is obtained by transcribing the first text according to a transcription format in another transcription format.

As illustrated in FIG. 5, the "smart" in the first transcription format in the text matching list stored in the storage 120 may be matched to "스바느" in the second transcription format, "4" in the first transcription format may be matched to "포:" in the second transcription format, "사" in the third transcription format, "녓" in the fourth transcription format, and "+" in the first transcription format may be matched to "플러스" in the second transcription format, "plus" in the third transcription format, or the like, respectively.

The matching list may be established by an artificial intelligence (AI) system utilizing a machine learning algorithm, wherein the AI system is a computer system that implements a human level of intelligence, so that the voice recognition rate may be improved as the machine learns and determines itself.

AI technology is composed of machine learning (deep learning) technology that uses algorithm capable of classifying or learning characteristics of input data and element technology that simulates functions, such as recognition and judgment of a human brain, using machine learning algorithms. As an example of element technology, language understanding technology for recognizing language/character of a human may be applied to the disclosure.

In the language understanding technology, a language/character of a human is recognized and applied/processed, including natural language processing, machine translation, dialog system, query and response, voice recognition/synthesis, etc. According to an embodiment, the second text, which transcribes the first text, among the matching list stored in the storage 120, according to various transcription formats, may be trained by artificial intelligence (AI) and continuously updated.

By AI, database (DB) for various transcription formats of a text may be automatically built. Thus, the voice recognition rate may be improved efficiently and continuously, as the various representations of a particular text or various transcriptions of a particular text that a particular user or a plurality of users read for a particular text may be continuously extended.

The processor 130 may extend the voice text converted from the user voice based on the text matching list stored in the storage 120, and execute the search module 121 stored in the storage 120 to identify the instruction corresponding to the user voice. The search module 121 may identify, from the preset instruction list 42, a token included in the voice text and a token that matches the token to identify the instruction.

The preset instruction list 42 is an instruction list stored in the storage 120 and may be a list of key instructions for executing a main function of the display device 100.

The preset instruction list 42 may also be a list of instructions displayed in the user interface (UI) provided in the display 140 of the display device 100, for example, a list of instructions displayed in the UI that is provided in a voice touch environment. If the corresponding UI is a UI provided from the second server 30 providing the content-related information, the processor 130 may generate the instruction list 42 by receiving the instruction displayed on the corresponding UI from the second server 30 or performing image analysis on the screen displayed on the display 140 to recognize the instruction displayed on the UI.

The token included in the voice text may be the first text or the second text included in a text matching list.

If the token included in the voice text is a first text, the processor 120 may identify a second text corresponding to the first text, extend the second text to an additional search word, and if the token included in the voice text is a second text, the processor 120 may identify the first text corresponding to the second text and extend the first text to an additional search word.

For example, if the voice text converted from the user voice is a "스마트 티비 홈," the token for searching instructions corresponding to the user voice from the instruction list 42 may be extended to "스마트", "티비," "홈" which form the voice text, and "smart", "TV", and "home" corresponding to "스마트", "티비" and "홈".

In addition, if the voice text that is obtained by transcribing the user voice is "TV+", the token for searching instructions corresponding to the user voice from the instruction list 42 may be extended to "TV", "+", "디비", "플러스" and "plus."

The processor 130 may divide the instruction stored in the instruction list 42 into a token that is a preset text unit, calculate a similarity score between each of the extended search term and the word of the instruction stored in the instruction list 42, and identify the instruction having the highest similarity score. When the instruction is identified, the processor 130 may execute the function execution module 122 stored in the storage 120 to execute a function corresponding to the identified instruction.

The set Q of each token forming the voice text converted from the user voice and a set of the token $Q_{ex}$ which is identified from the text matching list based on the voice text are expressed as follows.

$$Q=[q_1, q_2, \ldots q_n] \quad [\text{Equation 1}]$$

$$Q_{ex}=[q_1, q_2, \ldots q_n, q_n, q_{(1,1)}, \ldots q_{(1, m)}, \ldots q_{(n, 1)}, \ldots q_{(n,1)}] \quad [\text{Equation 2}]$$

In Equation 1, $q_1$ to $q_n$ refer to each token constituting the voice text. For example, if the voice text Q is a "Smart Home TV ( 스마트 홈 티비 )", then Q may be represented as a set of $q_1$ (Smart), $q_2$ (Home), $q_3$ (TV).

In Equation 2, q(1,1) to q(1, m) refers to at least one token according to a different transcription format of the token q1 constituting the voice text, and q (n, 1) to q (n, 1) means at least one token according to a different transcription format of the token qn constituting the voice text.

Figure 6:
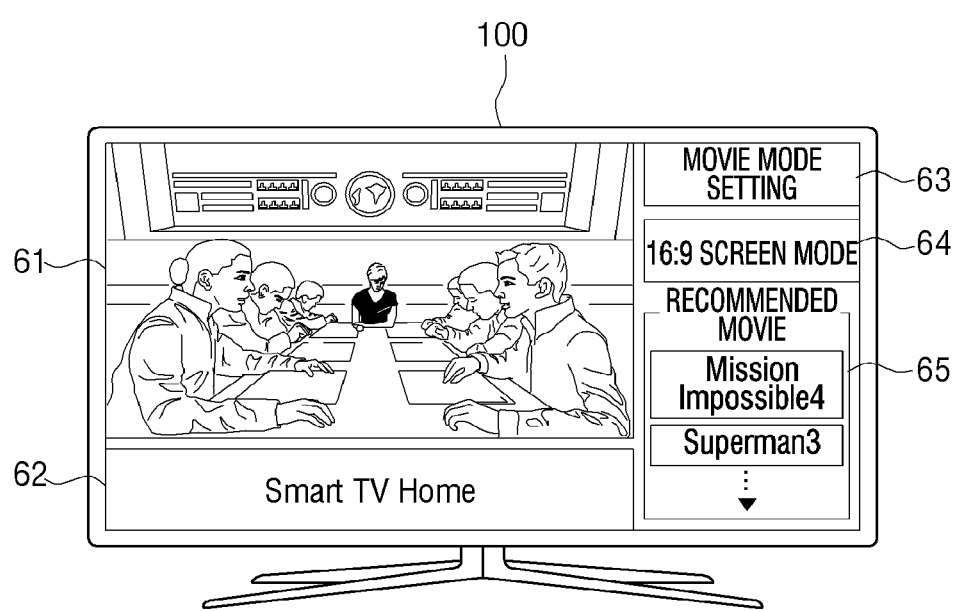
FIG. 6 is a diagram illustrating a voice touch screen in which instructions according to an embodiment are displayed.

With reference to FIG. 6, a specific method for executing a function according to a user voice in the voice touch environment will be described.

FIG. 6 is a diagram illustrating a voice touch screen in which instructions according to an embodiment are displayed.

FIG. 6 illustrates a displayed voice touch screen according to an embodiment. A user may select and execute each UI 62-65 provided in the display 140 of the display device 100 by unerring the user voice in a voice touch environment.

The screen of the display 140 may be displayed with a UI 62 that includes a first instruction "Smart TV home," a UI 63 that includes a second instruction, "movie mode setting(영화 모드 설정)", a UI 64 that includes a third instruction, "16:9 screen mode", and a UI 65 that includes a fourth instruction, "Mission Impossible 4."

If the voice text converted from the user's uttered voice is "Smart TV home", the processor 130 may divide "smart TV home(스마트 티비 홈)" in a token unit ("smart(스마트)", "TV(티비)", "home(홈)"), and if at least one of each token included in the voice text is included in the second text of the matching list stored in the storage 120, the processor 130 may identify the first text corresponding to the second text from the matching lists. At this time, the processor 130 may identify instructions corresponding to user voice from the instruction list 42 based on the identified first text and the second text, and execute functions according to the identified instructions. Since the "smart", "TV" and "home" are included in the second text of the matching list, the processor 130 may identify "smart", "TV" and "home" corresponding to "스마트", "홈" and "티비", respectively, from the matching list.

The processor 130 may identify the first instruction, which is the most similar instruction, by comparing the instructions displayed on the display 140 with the "스마트", "티비", "홈", "smart", "TV", "home", which are the extended tokens, and may execute the function corresponding to the UI 62 including the first instruction.

Specifically, the processor 130 may calculate a first similarity score of the instruction and the user voice displayed on the display 140 based on whether any one of the extended tokens is included in the instructions displayed on the display 140, and may execute the function according to the preset instruction if the calculated first similarity score is greater than or equal to the preset threshold value.

For example, the processor 130 may divide the first instruction "Smart TV home" in a token unit and assign a score of "1" for the token "smart" if the "smart" is included in any one of the extended tokens of the voice text and may assign a score of "0" if not included in any one of the extended tokens of the voice text. Similarly, the processor 130 may assign a score based on whether each token is included in any one of the extended tokens of the voice text for the token "TV" and "home" of the first instruction.

The processor 130 may calculate the first similarity score which is obtained by adding up the scores assigned to "smart," "TV," and "home", respectively, and dividing the scores with the number of tokens of "smart TV home" which is the first instruction.

In this embodiment, the token "smart", "TV" and "home" of the first instruction are all included in the extended token of the voice text, so that a score of "1" is assigned, and the first similarity score may be "1" which is obtained by dividing the number of 3 in which each assigned score is added by the number of tokens 3. Through this, the processor 130 may recognize that the instruction corresponding to the user voice is "Smart TV home", which is the first instruction, and execute a function corresponding to the UI 62 including the first instruction "Smart TV home."

The processor 130 may further calculate a second similarity score of the first instruction and the user voice based on whether each of the tokens constituting the first instruction is included in the extended token of the voice text, and may perform a function corresponding to the UI 62 including the first instruction "Smart TV home," if each of the calculated first and second similarity scores is greater than or equal to the preset threshold. The second similarity score may be a value obtained by dividing the number of tokens included in the extended token of the voice text among the tokens constituting the first instruction divided by the number of tokens constituting the first instruction.

In the present embodiment, since the tokens constituting the first instruction, "smart", "TV" and "home" are all included in the extended token of the voice text, the second similarity score may be "1" which is obtained by dividing the number of tokens of the first instruction included in the extended token of the voice text by 3, which is the number of token of the first instruction.

As another embodiment, if the voice text converted from the voice uttered by a user is a "moving setting (영화 설싱)", the processor 130 may divide the "movie settings" in a unit of a token ("movies", "setting"), and similarly calculate a first similarity score. Here, it is assumed that there is no token that transcribes the token "movie" and "setting" of the voice text in a different transcription format.

As the tokens of the voice text "movie" and "setting" are included in the second instruction "movie mode setting," the first similarity score may be "1."

However, the terms "movie", "mode" and "setting", each token in "movie mode setting", are included in the token of the voice text, but the "mode" is not included in the token of the voice text, so that the second similarity score can be "2/3" which is obtained by dividing 2 which is the number of tokens of the second instruction included in the token of the voiced text by 3 which is the number of token of the second instruction. If the second similarity score "2/3" is greater than or equal to the preset threshold value, the processor 130 may perform a function corresponding to the UI 63 including the second instruction "movie mode setting", and if the preset threshold value is less than or equal to the preset threshold value, the processor 130 may not perform the corresponding function.

When considering a second similarity score in addition to the first similarity score, more accurate voice recognition may be possible.

In addition, since the voice recognition method of does not consider the order of the tokens constituting the voice text, even in a case when the order of each token constituting the "16:9 screen mode" is changed, as the case in which the voice text converted from the voice uttered by the user is "screen mode 16:9," the first and second similarity scores can all be 1. Accordingly, a function corresponding to the UI 64 including the "16:9 screen mode" as the third instruction may be executed.

In another embodiment, if the voice text uttered by the user is " 미션," 임파서블 포 the processor 130 may divide the "미션 임파서블 포" in a token unit ("미션," "임파서블," " 포"), and extend each token included in the voice text. The processor 130 may identify "mission," "implosive," and "4" corresponding to "미션", " 임파서블" and " 포," respectively, from the matching list.

The processor 130 may identify the fourth instruction which is the most similar instruction by comparing the extended token, the " 미션," " 임파서블," " 포", "mission", "imposeable", "4" and the instructions displayed on the display 140, and execute a function corresponding to the UI 65 including the fourth instruction.

In this embodiment, the first and second similarity scores may be "1" by the above method.

Further, by further extending the above-described embodiment, the matching list may store a TV program name " 냉장고를 부탁해", which is a preset instruction, as a first text, and " 냉부해", which is an abbreviation of " 냉장고를 부탁해" as the second text. Accordingly, even if a user utters " 냉부해", the user may search an instruction with a token, " 냉부해" which is the voice text converted from the user voice and the first text " 냉장고를" 부탁해" which matches the " 냉부해" and thus, the search probability may be increased.

The instruction may be identified using only the first similarity score or using only the second similarity score, but the instruction may be recognized using both the first and second similarity scores, as described above, to increase the accuracy of the instruction identification.

Figure 7:
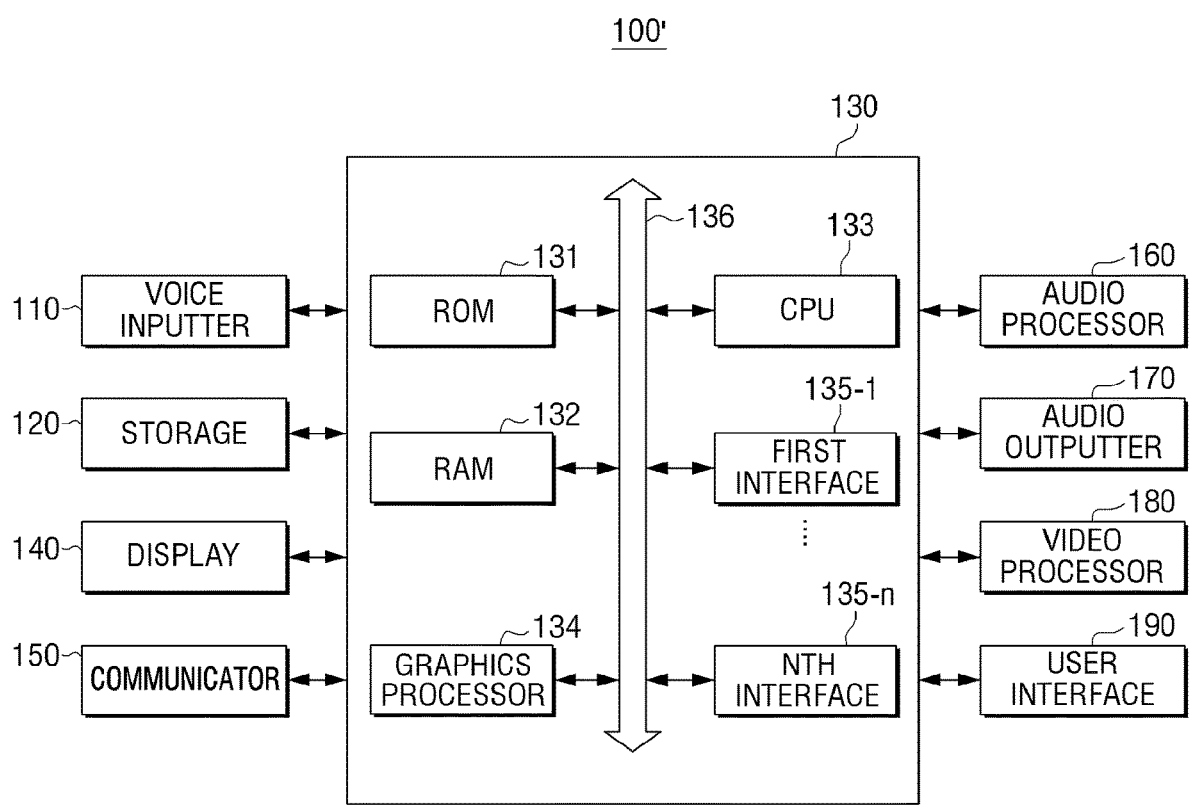
FIG. 7 is a block diagram specifically illustrating a configuration of the electronic device according to another embodiment.

FIG. 7 is a block diagram specifically illustrating a configuration of the electronic device according to another embodiment.

As illustrated in FIG. 7, according to another embodiment, an electronic device 100' includes the voice inputter 110, the storage 120, the processor 130, the display 140, a communicator 150, an audio processor 160, an audio outputter 170, a video processor 180, and a user interface 190. The overlapped description of FIGS. 1A to 1C will be omitted.

The storage 120 may store various data such as various multimedia content, an OS software module for driving the electronic device 100', or the like.

Specifically, the storage 120 may store a base module for processing a signal transmitted from respective hardware included in the electronic device 100', a storage module for managing a database (DB) or a registry, a graphic processing module for generating a screen of the layout, and a security module.

As illustrated in FIG. 4, the storage 120 may store a search module 121 for searching an instruction from the preset instruction list 42 and a function execution module 122 for executing a function according to the searched instruction.

The processor 130 may include a read-only memory (ROM) 131, a random access memory (RAM) 132, a main central processing unit (CPU) 133, a graphics processor 134, first to $n^{th}$ interfaces 135-1~135-n. The ROM 131, RAM 133, the CPU 133, the graphics processor 134, the first to $n^{th}$ interfaces 135-1 to 135-n, or the like, may be interconnected through a bus 136.

The CPU 133 accesses the storage 120 and performs booting using an operating system (OS) stored in the storage 120, and performs various operations using various programs, contents data, or the like, stored in the storage 120.

The ROM 131 stores one or more instructions for booting the system and the like. When the turn-on instruction is input and power is supplied, the CPU 133 copies the OS stored in the storage 120 to the RAM 132 according to the stored one or more instructions in the ROM 131, and executes the OS to boot the system. When the booting is completed, the CPU 133 copies various application programs stored in the storage 120 to the RAM 132, executes the application program copied to the RAM 132, and performs various operations.

The graphics processor 134 generates a screen including various objects such as an icon, an image, a text, or the like, using a calculator (not shown) and a renderer (not shown). Here, a calculator may calculate an attribute value such as a coordinate value, a shape, a size, and a color to be displayed by each object according to the layout of the screen. A renderer may generate screens of various layouts including objects based on the attribute value calculated by the calculator.

The first interface 135-1 to the $n^{th}$ interface 135-$n$ are connected to the aforementioned elements. One of the interfaces may be a network interface connected to an external device through the network.

The operation of the processor 130 may be performed by executing a program stored in the storage 120.

The display 140 is configured to provide a screen including various contents that are reproducible in the electronic device 100'. The content may include a content of various formats such as a text, an image, a moving image, a graphic user interface (GUI), or the like.

An implementation method of the display 140 is not limited and may be implemented as various formats, for example, a liquid crystal display (LCD), organic light emitting diodes (OLED) display, active-matrix organic light-emitting diode (AM-OLED), plasma display panel (PDP), or the like. The display 140 may additionally include additional configurations depending on the implementation schemes. For example, when the display 140 is a liquid crystal display, the display 140 may include an LCD display panel (not shown), a backlight unit (not shown) for supplying light thereto, and a panel driving substrate (not shown) for driving a panel (not shown).

The communicator 150 is configured to communicate with an external device according to various types of communication methods. The communicator 150 may transmit or receive data to and from an external device according to various communication standards such as infrared, radio frequency (RF), near field communication (NFC), ZigBee, digital living network alliance (DLNA), Wi-Fi, Bluetooth, long term evolution (LTE), or the like. Alternatively, the communicator 150 may be connected to a wired/wireless network including the Internet network for transceiving data with an external device.

The communicator 150 may include various communication chips, such as a Wi-Fi chip, a Bluetooth chip, a wireless communication chip, or the like, to perform communication according to the communication method described above with the external device, and the communicator 150 may communicate with other the electronic devices including a server using the chips. The communicator 150 may include a wired communication chip, a wired communication terminal, or the like, for performing communication with an external device through a wired communication method.

The communicator 150 may include a first communicator 151 for communicating with the external first server 20 for performing voice recognition, a second communicator 152 for communicating with the external second server 30 for providing broadcast content or content-related information, a third communicator 153 for receiving user voice from the remote controller 10, and a fourth communicator 154 for communicating with the external display device 200 to transmit an image to the display device 200.

An audio processor 160 is configured to perform processing for audio data.

An audio outputter 170 is configured to output audio data processed by the audio processor 160.

The video processor 180 is configured to perform various image processing such as decoding, scaling, noise filtering, frame rate conversion, resolution conversion, or the like, for the content.

A user interface 190 is configured to detect a user interaction to control the overall operation of the electronic device 100'. The user interface 190 may include various interaction detecting devices, such as an infrared (IR) signal receiver (not shown), a camera (not shown), and the like. The user interface 190 may receive signals for the electronic device 100' to be turned on from the remote controller 10 via an IR signal receiver, and may receive various control signals from the remote controller 10 while the electronic device 100' is turned on.

FIG. 8 is a flowchart illustrating a method for controlling the electronic device according to an embodiment.

First, a user voice may be input through the electronic device in operation S810. The electronic device stores the first text according to the first transcription format and at least one second text that is obtained by transcribing the first text in a second transcription format, and the first text and the second txt may be directly input by a user, or prestored in the electronic device in a manufacturing process.

If the voice text which is converted from the input user voice corresponds to a preset instruction, a function according to the preset instruction is executed.

If the preset instruction includes the first text according to the first transcription format, and the voice text converted from the user voice is the text in which the first text of the preset instruction is transcribed with the second text in the second transcription format, a function according to the preset instruction may be executed. The voice text may be divided in a preset unit, and if at least one of the text units of the voice text includes the second text, the first text corresponding to each of the second text may be identified, and a function according to the identified instruction may be executed based on the identified first text and the second text.

Based on the text unit of the voice text and whether one of the identified first texts is included in the preset instruction, the first similarity score of the preset instruction and the user voice may be calculated, and if the calculated first similarity score is greater than or equal to the preset threshold value, the function according to the preset instruction may be executed.

The preset instruction may be divided in a preset text unit, and the second similarity score of the preset instruction and the user voice may be calculated based on whether each of the text units of the preset instruction is included in one of the text unit of the voice text and the identified first text. At this time, if each of the calculated first and second similarity scores is greater than or equal to a preset threshold value, a function according to the preset instruction may be executed.

According to various embodiments as described above, even when there is a mismatch between a voice recognition result and an instruction transcription, a function of an instruction according to the intention of a user may be executed, thereby increasing the convenience of a user.

The control method according to the various embodiments described above may be implemented as a program and stored in various recordable medium. That is, a computer program that can be processed by various processors to execute the various control methods described above may be used in a state stored in a recordable medium.

As an example, a non-transitory computer readable medium storing a program for executing i) receiving a preset instruction including a first text in a first transcription format and at least one second text that is obtained by transcribing the first text in a second transcription format, ii) receiving a user voice, and iii) based on a text that is obtained by converting a user voice including the second text, executing a function according to a preset instruction may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the preferred embodiments have been shown and described, the disclosure is not limited to the specific embodiments, and it is to be understood that the disclosure is not limited to the specific embodiments as described above, it will be understood by those of ordinary skill in the art that various changes in form and details may be made therein without departing from the spirit and scope as defined by the following claims and their equivalents.

What is claimed is:

1. An electronic device comprising:
a communicator;
a voice input receiver; and
a processor configured to:
based on a first user voice input corresponding to a first format being received through the voice input receiver, receive first data corresponding to the first user voice input from a server through the communicator, and perform a first function corresponding to the first data; and
based on a second user voice input corresponding to a second format being received through a microphone of an external device, receive second data corresponding to the second user voice input from the server through the communicator, and perform a second function corresponding to the second data,
wherein, based on a pronunciation of the first user voice input received through the voice input receiver in the first format corresponding to a pronunciation of the second user voice input received through the microphone of the external device in the second format different from the first format of the first user voice input, the first function according to the first user voice input is the same as the second function according to the second user voice input even though there is a mismatch between the first data and the second data.

2. The electronic device of claim 1, wherein the first user voice input is a voice input in which a user pronounces a first text in a first language, and
wherein the second user voice input is a voice input in which another user pronounces a second text where the first text is expressed in a second language, in the second language.

3. The electronic device of claim 2,
wherein the first language is Korean, and the second language is English.

4. The electronic device of claim 1, wherein a text is displayed on a display of the electronic device in relation to the first user voice input, and
wherein another text is displayed on the display of the electronic device in relation to the second user voice input.

5. The electronic device of claim 1, further comprising:
a display,
wherein the processor is configured to control the display to display a first UI corresponding to execution of the first function, and to control the display to display a second UI corresponding to execution of the second function.

6. The electronic device of claim 5, wherein the first UI is the same as the second UI.

7. The electronic device of claim 1, further comprising:
a display,
wherein the processor is configured to:
based on the first user voice input corresponding to a content, perform the first function by controlling the display to display information regarding the content received from the server through the communicator, and
based on the second user voice input being corresponding to the content, perform the second function by controlling the display to display information regarding the content received from the server through the communicator.

8. The electronic device of claim 1, wherein the first data corresponding to the first user voice input includes a first text related to the first user voice input,
wherein the second data corresponding to the second user voice input includes a second text related to the second user voice input, and wherein the processor is configured to:
based on the first text corresponding to a command stored in the electronic device, perform the first function based on the command, and
based on the second text corresponding to the command stored in the electronic device, perform the second function based on the command.

9. A method for controlling an electronic device, the method comprising:
based on a first user voice input corresponding to a first format being received through a voice input receiver of the electronic device, receiving first data corresponding to the first user voice input from a server, and performing a first function corresponding to the first data; and
based on a second user voice input corresponding to a second format being received through a microphone of an external device, receiving second data corresponding to the second user voice input from the server, and performing a second function corresponding to the second data,
wherein based on a pronunciation of the first user voice input received through the voice input receiver in the first format corresponding to a pronunciation of the second user voice input received through the microphone of the external device in the second format different from the first format of the first user voice input, the first function according to the first user voice input is the same as the second function according to the second user voice input even though there is a mismatch between the first data and the second data.

10. The method of claim 9,
wherein the first user voice input is a voice input in which a user pronounces a first text in a first language, and
wherein the second user voice input is a voice input in which another user pronounces a second text where the first text is expressed in a second language, in the second language.

11. The method of claim 10,
wherein the first language is Korean, and the second language is English.

12. The method of claim 9, wherein
a text is displayed on a display of the electronic device in relation to the first user voice input, and wherein another text is displayed on the display of the electronic device in relation to the second user voice input.

13. The method of claim 9, further comprising:
displaying a first UI corresponding to execution of the first function; and
displaying a second UI corresponding to execution of the second function.

14. The method of claim 13, wherein the first UI is the same as the second UI.

15. The method of claim 9,
wherein the performing the first function comprises based on the first user voice input corresponding to a content, displaying information regarding the content received from the server, and
wherein the performing the second function comprises based on the second user voice input corresponding to the content, displaying information regarding the content received from the server.

16. The method of claim 9, wherein the first data corresponding to the first user voice input includes a first text related to the first user voice input,
wherein the second data corresponding to the second user voice input includes a second text related to the second user voice input,
wherein the performing the first function comprises based on the first text corresponding to a command stored in the electronic device, performing the first function based on the command, and
wherein the performing the second function comprises based on the second text corresponding to the command stored in the electronic device, performing the second function based on the command.

17. A non-transitory computer readable recording medium that stores a computer instruction for an electronic device to perform an operation when executed by a processor of the electronic device, the operation comprising:
based on a first user voice input corresponding to a first format being received through a voice input receiver of the electronic device, receiving first data corresponding to the first user voice input from a server, and performing a first function corresponding to the first data; and
based on a second user voice input corresponding to a second format being received through a microphone of an external device, receiving second data corresponding to the second user voice input from the server, and performing a second function corresponding to the second data,
wherein based on a pronunciation of the first user voice input received through the voice input receiver in the first format corresponding to a pronunciation of the second user voice input received through the microphone of the external device in the second format different from the first format of the first user voice input, the first function according to the first user voice input is the same as the second function according to the second user voice input even though there is a mismatch between the first data and the second data.

18. The non-transitory computer readable recording medium of claim 17, wherein the first user voice input is a voice input in which a user pronounces a first text in a first language, and
wherein the second user voice input is a voice input in which another user pronounces a second text where the first text is expressed in a second language, in the second language.

19. The non-transitory computer readable recording medium of claim 18,
wherein the first language is Korean, and the second language is English.

20. The non-transitory computer readable recording medium of claim 19, wherein a text is displayed on a display of the electronic device in relation to the first user voice input, and
wherein another text is displayed on the display of the electronic device in relation to the second user voice input.

* * * * *